United States Patent Office 3,533,978
Patented Oct. 13, 1970

3,533,978
VINYL CHLORIDE RESIN PLASTISOLS
Allan R. Bullman, Bernardsville, N.J., and John P. Gilvary, Baltimore, Md., assignors to Union Carbide Corporation, a corporation of New York
No Drawing. Filed May 10, 1967, Ser. No. 637,333
Int. Cl. C08f 29/22
U.S. Cl. 260—30.6                              5 Claims

ABSTRACT OF THE DISCLOSURE

Vinyl chloride resin plastisols of improved tensile strength comprising a vinyl chloride resin, tricresyl phosphate plasticizer, a stabilizer and a thermoplastic polyarylene polyether.

FIELD OF THE INVENTION

This invention relates to modified vinyl chloride resin plastisols characterized by improved tensile strength. As such, these improved plastisols find a wider scope of application as compared to conventional vinyl chloride resin plastisols. An important feature of the present invention is the fact that while an increase in tensile strength is gained, there is substantially no degradation of the elongation properties of the plastisols as has generally been the case with prior tensile strength modifiers for vinyl chloride resin plastisols.

SUMMARY

The plastisol compositions of this invention comprise a vinyl chloride resin, tricresyl phosphate plasticizer, a stabilizer and from 0.5 to 40 parts by weight, based on 100 parts by weight of resin, of a thermoplastic polyarylene polyether of the type described herein. The plastisol compositions of this invention find utility as spread coatings for papers and like substrates, as metal coatings, both primer and topcoat, foams, dip coatings, poured or injected moldings, spray coatings, extrusion coatings and other applications where vinyl chloride resin plastisols have been used heretofore.

As used herein, the term "plastisol" should be understood to mean what it is conventionally understood to mean in the art, namely a vinyl chloride resin dispersion in which the liquid phase consists solely of a plasticizer, which in this invention is tricresyl phosphate.

DESCRIPTION

Thermoplastic polyarylene polyethers used in the present invention are linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho, and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis - (4 - hydroxyphenyl)-2-phenylethane, bis - (4 - hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO$_2$—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

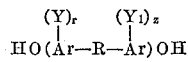

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like;

di(hydroxyphenyl)sulfones such as bis - (4 - hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl) ether, the 4,3'-, 4,2'-, 2,2'-, 2,3'-dihydroxydiphenyl ethers, 4,4'-dihydroxy-2,6-dimethyldiphenyl ether, bis-(4-hydroxy- 3-isobutylphenyl)ether, bis-(4-hydroxy-3-isopropylphenyl) ether, bis-(4-hydroxy - 3 - chlorophenyl)ether, bis - (4-hydroxy-3-fluorophenyl)ether, bis-(4 - hydroxy - 3 - bromophenyl)ether, bis - (4 - hydroxynaphthyl)ether, bis-(4-hydroxy - 3 - chloronaphthyl)ether, 4,4′ - dihydroxy-3,6-dimethoxydiphenyl ether, 4,4′-dihydroxy - 2,5 - diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E′ of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—$SO_2$—) bonding two halogen substituted benzenoid nuclei as in the 4,4′-dichlorodiphenyl sulfone and 4,4′-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent groups which can activate displacement of halogens on two different rings, such as the sulfone group —$SO_2$—; the carbonyl group —CO—; the vinylene group —CH=CH—; the sulfoxide group —SO—; the azo-group —N=N—; the saturated fluorocarbon groups —$CF_2$—$CF_2$—; organic phosphine oxides

where R is a hydrocarbon group, and the ethylidene group

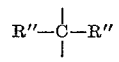

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E′ residuum of the benzenoid compounds in the polymer structure may be the same or different.

It is seen also that as used herein, the E′ term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E′ is the residuum of a dinuclear benzenoid compound. These preferred polymers then are composed of recurring units having the formula

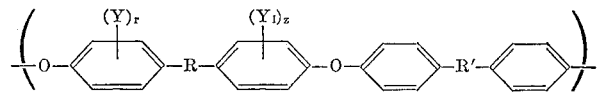

wherein R represents a member of the group consisting of a bond between aromatic carbon atoms and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical $$R''-\underset{|}{\overset{|}{C}}-R''$$

wherein R″ represents a member of the group consisting of hydrogen, lower alkyl, lower aryl, and the halogen substituted groups thereof, and R′ is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds. The preparation of a specific polyarylene polyether is detailed in Example 1 below and the one-step and two-step processes referred to above are described in detail in U.S. Pat. 3,264,536, issued Aug. 2, 1966.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

As indicated previously, the thermoplastic polyarylene polyether is present in the plastisol compositions in an amount of from 0.5 to 40 parts by weight based on 100 parts by weight of vinyl chloride resin and preferably from 2 to 10 parts by weight.

It has been found that the use of tricresyl phosphate as the plasticizer is critical in this invention in that it is the only plasticizer found to cooperate with the polyarylene polyether by dissolving it in such a manner that the polyarylene polyether is able to impart an increase in the tensile strength of a plastisol without any suubstantial degradation in elongation. The polyarylene polyethers are soluble in other known plasticizers and the presence of these other plasticizers in the plastisol can be tolerated in combination with tricresyl phosphate. It has been found that to obtain an increase in tensile strength, the polyarylene polyether must first be dissolved in the tricresyl phosphate and the solution added during the otherwise conventional preparation of the plastisol.

For purposes of the present invention, tricresyl phosphate is generally employed in amounts of from 20 to 80 parts by weight based on 100 parts by weight of vinyl chloride resin, and useful solutions of polyarylene polyether in tricresyl phosphate generally contain at least 10 parts by weight of polyarylene polyether based on the weight of the solution.

Vinyl chloride resins suitable for purposes of this invention are vinyl chloride homopolymers and vinyl chloride copolymers wherein the vinyl chloride is copolymerized with at least one other mono-ethylenically unsaturated monomer provided that the copolymers contain at least about 95 percent by weight vinyl chloride polymerized therein; with the vinyl chloride resins as described generally having a density of from about 1.35 to about 1.45, preferably 1.40, and generally having a specific viscosity of from about 2.20 to about 3.5, preferably from about 2.4 to about 2.7.

The particles of the vinyl chloride resins which are dispersed in the tricresyl phosphate plasticizer to form the plastisols are small, essentially spherical and on the average are about 0.1 micron to about 40.0 microns in diameter, preferably about 0.1 micron to about 1 micron in diameter.

The vinyl chloride resins can be produced by any convenient method, as for example by the emulsion polymerization of desired monomers.

It is to be understood that, if desired, the vinyl chloride homopolymers and the vinyl chloride copolymers as described can be halogenated as for example by treating them with chlorine gas as described in U.S. Pat. No. 1,982,765, issued Dec. 4, 1934.

Ethylenically unsaturated compounds which can be copolymerized with vinyl chloride to produce suitable vinyl chloride resins include, among others, vinylidene halides, such as vinylidene chloride, vinylidene bromide and the like; vinyl esters, such as vinyl acetate, vinyl propionate, vinyl butyrate, vinyl chloroacetate, vinyl chloropropionate, vinyl stearate, vinyl chlorobenzoate; acrylic and alpha-alkyl acrylic acids, their alkyl esters, their amides, and their nitriles, such as acrylic acid, chloroacrylic acid, methacrylic acid, ethacrylic acid, methyl acrylate, ethyl acrylate, butyl acrylate, octyl acrylate, 2-ethylhexyl acrylate, decyl acrylate, methyl methacrylate, ethyl ethacrylate, acrylamide, N-methyl acrylamide, N,N-di-methyl acrylamide, methacrylamide, N-methyl methacrylamide, N,N-dimethyl methacrylamide, acrylonitrile, chloroacrylonitrile, methacrylonitrile, ethacrylonitrile and the like; vinyl aromatic compounds such as styrene, dichlorostyrene, vinyl naphthalene and the like; alkyl esters of maleic and fumaric acids, such as dimethyl maleate, dibutyl maleate, and the like; vinyl alkyl ethers and vinyl alkyl ketones, such as vinyl methyl ether, vinyl ethyl ether, methyl vinyl ketone, ethyl vinyl ketone, isobutyl vinyl ketone, and the like. Other suitable mono-ethylenically unsaturated monomers are vinyl pyridine, N-vinyl carbazole, N-vinyl pyrrolidene, ethyl methylene malonate, isobutylene, ethylene, trichloroethylene and the like.

Any known stabilizer for vinyl chloride resin plastisol compositions can be used in this invention. Such stabilizer usually counter the effects of exposure to heat and/or light and usually have one or more of the following features: hydrogen chloride acceptor; reactive dienophilic molecule; selective ultraviolet absorber; and antioxidant. Suitable stabilizers include metallic oxides, salts and soap the most common of which are lead, barium, cadmium and calcium, organometallic and organic compounds such as the alkyl and/or aryl phosphites, the metal alkyl aryl phosphite, barium-cadmium laurate, triaryl phosphate, barium ricinoleate, cadmium 2-ethyl-hexanoate, tin mercaptide, sodium alkyl phosphate, and the like. Stabilizers are normally employed in amounts of from 2 to 5 parts by weight based on 100 parts by weight of vinyl chloride resin.

The plastisols of this invention are conveniently prepared by weighing each component of each formulation into a suitable mixing container wherein the materials are homogeneously blended. The blending operation is generally conducted at room temperature, about 23° C. The plastisols, as a rule, are then deaerated, generally in a vacuum desicator, in order to insure freedom from occluded air bubbles. The plastisols can then be used as coatings or to form rigid or semi-rigid structures of any desired shapes by suitable forming operations such as injection molding, casting, roto-casting and the like.

If desired, additives, such as pigments, fillers, stabilizers, antioxidants, other resins, and the like can be added to the vinyl chloride resin plastisols of this invention, as is well known in the art.

The vinyl chloride resin plastisols of this invention are generally cast or molded by being heated in a mold cavity having the desired configuration at temperatures which are sufficiently high to fuse the plastisols, that is, at temperatures at which the vinyl chloride resin is substantially completely solvated in the tricresyl phosphate. Heating the vinyl chloride resin plastisols at a temperature on the order of about 165° C. to about 315° C. for a period of time ranging from about 1 to about 20 minutes is satisfactory for this purpose. The exact heating cycle to which each plastisol is subjected will, of course, depend upon its formulation and the thickness of the article which is being formed from the plastisol.

The following examples are intended to further illustrate the present invention without limiting same in any manner. Parts and percentages are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:
$t_o$ is the efflux time of the pure solvent
$t_s$ is the efflux time of the polymer solution
$c$ is the concentration of the polymer solution expressed in terms of grams of polymer per 100 ml. of solution.

EXAMPLE 1

Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis-(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° with good stirring for 4–5 hours. The viscous, orange solution was poured into 300 ml. water, rapidly circulating in a Waring Blender, and the finely divided white polymer was filtered and then dried in a vacuum oven at 100° for 16 hours. The yield was 22.2 g. (100%) and the reaction was 99% complete based on a titration for residual base.

The polymer had the basic structure

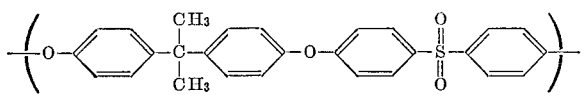

Note that the addition of polyarylene polyether results in an almost fifty percent increase in tensile strength without any substantial reduction in elongation.

EXAMPLE 3

Following the procedure of Example 2, the following ingredients were blended together:

| | Parts by weight | | |
|---|---|---|---|
| | Example 3A | Example 3B | Control |
| Emulsion polymerized polyvinyl chloride resin having an inherent viscosity of 1.17–1.27 | 100 | 100 | 100 |
| TCP | 85 | 85 | 85 |
| Epoxy ester stabilizer | 5 | 5 | 5 |
| Alkyl tin mercaptide stabilizer | 3 | 3 | 3 |
| Polyarylene polyether [1] | 5 | 2 | |

[1] Prepared as in Example 1 having an RV of 0.5; added as a 10 percent solution in TCP.

Drawdowns of each composition were prepared as in Example 3 but samples were baked at 205° C. for 10 minutes and at 260° C. for 4 minutes with the following results:

| | Tensile strength, p.s.i. | | Increase in tensile strength (p.s.i.) from 205° C. bake to 260° C. |
|---|---|---|---|
| | 205° C. bake | 260° C. bake | |
| Example 3A | 1,531 | 2,102 | 571 |
| Example 3B | 1,792 | 2,202 | 510 |
| Control | 1,639 | 1,934 | 295 |

EXAMPLE 4

Example 2 was repeated using various polyvinyl chloride resins. The following ingredients were used:

| | Parts by weight | | | | | | |
|---|---|---|---|---|---|---|---|
| | 4A | 4B | 4C | 4D | Control 1 | Control 2 | Control 3 |
| Emulsion polymerized polyvinyl chloride resin having an inherent viscosity of 1.14–1.27 | 100 | | | | 100 | | |
| Emulsion polymerized polyvinyl chloride resin having an inherent viscosity of 1.14–1.17 | | 100 | 100 | | | 100 | |
| Emulsion polymerized polyvinyl chloride resin having an inherent viscosity of 1.14 | | | | 100 | | | 100 |
| TCP | 85 | 85 | 90 | 85 | 80 | 80 | 80 |
| Epoxy ester stabilizer | 2 | 2 | 2 | 2 | 2 | 2 | 2 |
| Barium cadmium (phenate type) | 2 | 2 | 2 | 2 | 2 | 2 | 2 |
| Polyarylene polyether [1] | 5 | 5 | 10 | 5 | | | |

[1] Prepared as in Example 1 having an RV of 0.5; added as a 10 percent solution in TCP.

EXAMPLE 2

This example demonstrates the marked improvement in the tensile strength imparted to vinyl resin plastisols by polyarylene polyethers. The following ingredients were blended in a paddle blender at room temperature:

| | Parts by weight | |
|---|---|---|
| | Example 2 | Control |
| Emulsion polymerized polyvinyl chloride resin having an inherent viscosity of 1.35 | 100 | 100 |
| Butyl benzyl phthalate | 40 | 40 |
| Tricresyl phosphate (TCP) | 45 | 45 |
| Petroleum hydrocarbon | 25 | 25 |
| Ethylhexyl epoxytallate | 5 | 5 |
| Barium cadmium (phenate type) | 2 | 2 |
| Polyethylene glycol type | 0.5 | 0.5 |
| Polyarylene polyether [1] | 5 | 0 |

[1] Prepared as in Example 1 having an RV of 0.5; added as a 10 percent solution in TCP.

Ten mil net drawdowns of each composition were made on glass plates and baked at 177° C. for 10 minutes. Tensile properties were then measured according to ASTM D–638 with the following results:

| | Tensile strength, p.s.i. | Percent elongation | Increase in tensile strength over control, p.s.i. | Percent increase in tensile strength over control |
|---|---|---|---|---|
| Example 2 | 2,819 | 300 | 840 | 42.5 |
| Control | 1,979 | 290 | | |

Drawdowns were prepared as in Example 2 and baked at 177° C. for 10 minutes with the following results:

| | Tensile strength, p.s.i. | Increase in tensile strength over control | Percent increase | Percent elongation |
|---|---|---|---|---|
| 4A | 2,098 | 281 | 15 | 230 |
| Control 1 | 1,817 | | | 240 |
| 4B | 2,369 | 725 | 44.1 | 240 |
| 4C | 2,365 | 721 | 43.8 | 245 |
| Control 2 | 1,644 | | | 200 |
| 4D | 2,194 | 520 | 31.2 | 250 |
| Control 3 | 1,674 | | | 228 |

These examples demonstrate not only an increase in tensile strength over the controls but also, in 4B, 4C, and 4D, an increase in percent elongation over controls 2 and 3.

EXAMPLE 5

This example indicates the use of compositions of this invention as sealants which is demonstrated by an improvement in cohesion. The following sealant formulations were prepared using the general procedure of Example 2.

| | Parts by weight | |
|---|---|---|
| | Example 5 | Control |
| Polyvinyl chloride as in Example 3 | 100 | 100 |
| Calcium carbonate | 100 | 100 |
| Diisodecyl adipate | 80 | 80 |
| Bis(3,4-epoxy-6-methylcyclohexylmethyl adipate) | 10 | 10 |
| Hexa modified phenyl formaldehyde | 25 | 25 |
| TCP | 18 | 20 |
| Barium, cadmium, zinc (phenate type) | 2 | 2 |
| Polyarylene polyether [1] | 2 | |

[1] Prepared as in Example 2 having an RV of 0.5; added as a 10 percent solution in TCP.

Drawdowns were prepared as in Example 2 and plaques case in gallon can lids. Both the drawdowns (film samples) and the plaques were baked at 177° C. for 10 minutes with the following results:

| | Tensile strength, p.s.i. | | Percent elongation | |
|---|---|---|---|---|
| | Plaque | Film | Plaque | Film |
| Example 5 | 417 | 789 | 110 | 158 |
| Control | 356 | 715 | 115 | 128 |

An adhesive is only as strong as its cohesive and adhesive strength. If its adhesive strength is very high but it fails cohesively then it is not a good adhesive. Therefore, if the cohesive strength is improved as shown by this example, the overall adhesive material is improved and is stronger.

EXAMPLE 6

Thermoplastic polyarylene polyether having the formula

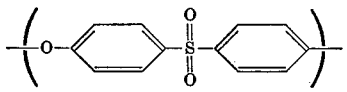

is prepared from 4,4'-dihydroxydiphenyl sulfone and 4,4'-dichlorodiphenyl sulfone according to the procedure in Example 1. This polymer is substituted for the polyarylene polyether in Example 2 and a plastisol is prepared as in Example 2. The plastisol is characterized by an increase in tensile strength as compared to the control of Example 2.

EXAMPLE 7

Thermoplastic polyarylene polyether having the formula

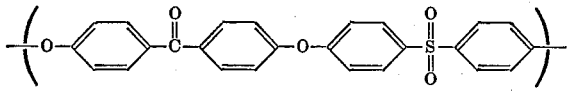

is prepared from the bisphenol of benzophenone and 4,4'-dichlorodiphenylsulfone according to the procedure in Example 1. This polymer is substituted for the polyarylene polyether in Example 3A and a plastisol is prepared as in Example 2. The plastisol is characterized by an increase in tensile strength as compared to the control of Example 3.

EXAMPLE 8

Thermoplastic polyarylene polyether having the formula

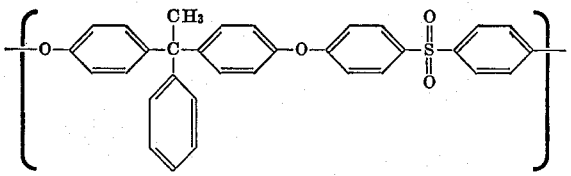

is prepared from the bisphenol of acetophenone and 4,4'-dichlorodiphenylsulfone according to the procedure in Example 1. This polymer is substituted for the polyarylene polyether in Example 4B and a plastisol is prepared as in Example 2. The plastisol is characterized by an increase in tensile strength as compared to control 2 of Example 4.

EXAMPLE 9

Thermoplastic polyarylene polyether having the formula

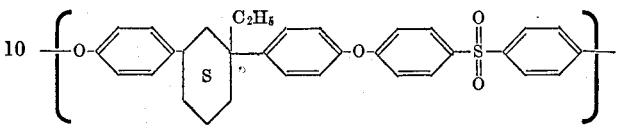

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure in Example 1. This polymer is substituted for the polyarylene polyether in Example 5 and a plastisol is prepared as in Example 2. The plastisol is characterized by an increase in tensile strength as compared to the control of Example 5.

EXAMPLE 10

Thermoplastic polyarylene polyether having the formula

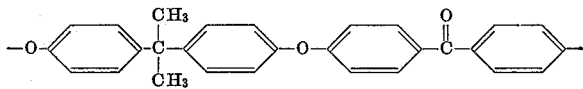

is prepared from 2,2'-bis-(4-hydroxyphenyl)propane and 4,4'-difluorobenzophenone according to the procedure in Example 1. This polymer is substituted for the polyarylene polyether in Example 4D and a plastisol is prepared as in Example 2. The plastisol is characterized by an increase in tensile strength as compared to control 3 of Example 4.

What is claimed is:

1. Vinyl chloride resin plastisol composition comprising a vinyl chloride resin containing at least about 95 percent by weight vinyl chloride, from 20 to 80 parts by weight tricresyl phosphate plasticizer based on 100 parts by weight of vinyl chloride resin, a stabilizer and from 0.5 to 40 parts by weight, based on 100 parts by weight of said resin, of a linear thermoplastic polyarylene polyether composed of recurring units having the formula

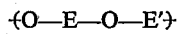

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

2. Composition of claim 1 wherein said polyarylene polyether is composed of recurring units having the formula

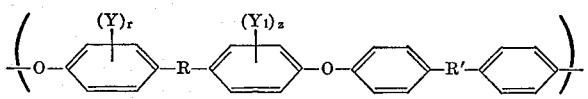

wherein R represents a member of the group consisting of a bond between aromatic carbon atoms and a divalent connecting radical and R' represents a member of the group consisting of sulfone, carbnoyl, vinylene, sulfoxide, azo, saturated fluorocarbon, organic phosphine oxide, and ethylidene groups and Y and $Y_1$ each represent inert substituent groups selected from the group consisting of halogen, alkyl groups having from 1 to 4 carbon atoms and alkoxy groups having from 1 to 4 carbon atoms where r and z are integers having a value from 0 to 4 inclusive.

3. Composition of claim 1 wherein said polyarylene polyether is composed of recurring units having the formula

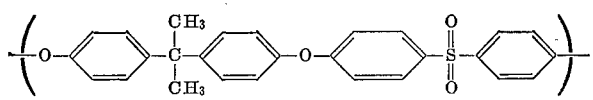

4. Composition of claim 1 wherein said polyarylene polyether is composed of recurring units having the formula

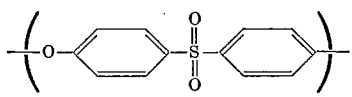

5. In a process for preparing a vinyl chloride resin plastisol which comprises blending a vinyl chloride resin containing at least about 95 percent by weight vinyl chloride, from 20 to 80 parts by weight tricresyl phosphate plasticizer based on 100 parts by weight of vinyl chloride resin and a stabilizer, the improvement which comprises blending in a solution of a linear thermoplastic polyarylene polyether composed of recurring units having the formula

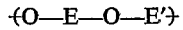

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms dissolved in tricresyl phosphate such that the resultant plastisol contains from 0.5 to 40 parts by weight of said polyarylene polyether based on 100 parts by weight of said resin.

References Cited

UNITED STATES PATENTS

| | | | |
|---|---|---|---|
| 3,221,080 | 11/1965 | Fox. | |
| 3,329,642 | 7/1967 | Lima et al. | 260—30.6 |
| 3,365,517 | 1/1968 | Barth | 260—49 |
| 3,383,435 | 5/1968 | Cizek | 260—47 |
| 3,420,792 | 1/1969 | Zuccaro. | |
| 3,431,230 | 3/1969 | Jackson et al. | 260—49 |

FOREIGN PATENTS 738,551   10/1955   Great Britain.

MORRIS LIEBMAN, Primary Examiner

H. H. FLETCHER, Assistant Examiner

U.S. Cl. X.R.

260—47, 49, 899